US005632340A

United States Patent [19]

Sundholm

[11] Patent Number: 5,632,340

[45] Date of Patent: May 27, 1997

[54] EQUIPMENT FOR FIGHTING FIRE WITH LIQUID FROM HYDRAULIC ACCUMULATORS IN A SUSPENSION STRUCTURE

[76] Inventor: Göran Sundholm, Ilmari Kiannon kuja 3, FIN-04310 Tuusula, Finland

[21] Appl. No.: 535,296

[22] PCT Filed: May 4, 1994

[86] PCT No.: PCT/FI94/00172

§ 371 Date: Nov. 3, 1995

§ 102(e) Date: Nov. 3, 1995

[87] PCT Pub. No.: WO94/25111

PCT Pub. Date: Nov. 10, 1994

[30] Foreign Application Priority Data

May 5, 1993 [FI] Finland .................................... 932038

[51] Int. Cl.$^6$ ........................................ B64D 1/16

[52] U.S. Cl. ........................................ 169/52; 169/53

[58] Field of Search ........................ 169/43, 46, 47, 169/53, 52; 239/171; 244/136

[56] References Cited

U.S. PATENT DOCUMENTS

| | | | |
|---|---|---|---|
| 2,250,762 | 7/1941 | Haberlin | 244/136 |
| 3,220,482 | 11/1965 | Eveleth | 169/53 X |
| 3,710,868 | 1/1973 | Chadwick | 169/53 |
| 4,285,403 | 8/1981 | Poland | 169/28 |
| 4,601,345 | 7/1986 | Mahrt | 169/53 |
| 4,881,601 | 11/1989 | Smith | 169/53 |
| 5,161,621 | 11/1992 | Shlomo | 169/46 |
| 5,385,208 | 1/1995 | Baker et al. | 169/53 X |

FOREIGN PATENT DOCUMENTS

| | | | |
|---|---|---|---|
| 1283681 | 3/1961 | Germany | 169/53 |
| 2909737 | 9/1980 | Germany . | |
| 87/06479 | 11/1987 | WIPO . | |

OTHER PUBLICATIONS

Derwent's Abstract, No. 81-J4581D/37, Week 8137, Abstract of SU, 1225585 (Feuer Wschgera Neuruppin (KWIA)), 23 Apr. 1986.

*Primary Examiner*—Andrew C. Pike

*Attorney, Agent, or Firm*—Ladas & Parry

[57] ABSTRACT

Equipment for fighting a fire has a suspension structure and hydraulic accumulators in the suspension structure for movement to within an action range of the fire. The hydraulic accumulators have outlet nozzles at one end for utilizing a high drive pressure in the hydraulic accumulators to produce, by suction effect, a fog-like penetrating liquid spray. In this regard, the suspension structure is a jacket structure for holding together the hydraulic accumulators in such a way that, between the hydraulic accumulators, there are longitudinal air channels.

8 Claims, 3 Drawing Sheets

EQUIPMENT FOR FIGHTING FIRE WITH LIQUID FROM HYDRAULIC ACCUMULATORS IN A SUSPENSION STRUCTURE

The present invention relates to a method and equipment for fighting fires, in particular outdoor fires difficult to extinguish, such as forest fires and oil fires.

Forest fires, oil fires, and many other types of fires are often either too inaccessible or too hot for early fighting of the fire.

The object of the invention is to provide a new method and new equipment to more efficiently than hereto fight such difficultly extinguishable fires.

The method of the invention is mainly characterized in that, by means of a preferably mobile construction, a set of hydraulic accumulators provided with outlet nozzles capable of, utilizing a high drive pressure, producing, by suction effect, a fog-like penetrating liquid spray, is brought to action range from a fire and thereafter the hydraulic accumulators are emptied into the fire.

According to a preferable mode of the method, the set of hydraulic accumulators is lowered from a helicopter to action range, the air stream generated by the main rotor of the helicopter preferably being utilized for intensifying the penetration power and the effect of the extinguishing liquid.

The equipment according to the invention is mainly characterized in that it comprises a set of hydraulic accumulators movable by means of a suspension structure to action range from a fire and provided with outlet nozzles capable of, utilizing a high drive pressure, producing, by suction effect, a fog-like penetrating liquid spray.

The set of hydraulic accumulators is preferably held together by an enveloping jacket structure preferably provided with jacket openings and/or a collecting air intake at the closed end of the hydraulic accumulators opposite to the nozzle heads.

By means of the invention e.g. distant forest fires can be quickly and efficiently fought, which has not been possible hereto.

The invention shall in the following be described in more detail with reference to a preferred exemplifying embodiment of the equipment according to the invention, shown in the attached drawing.

Figure 1:
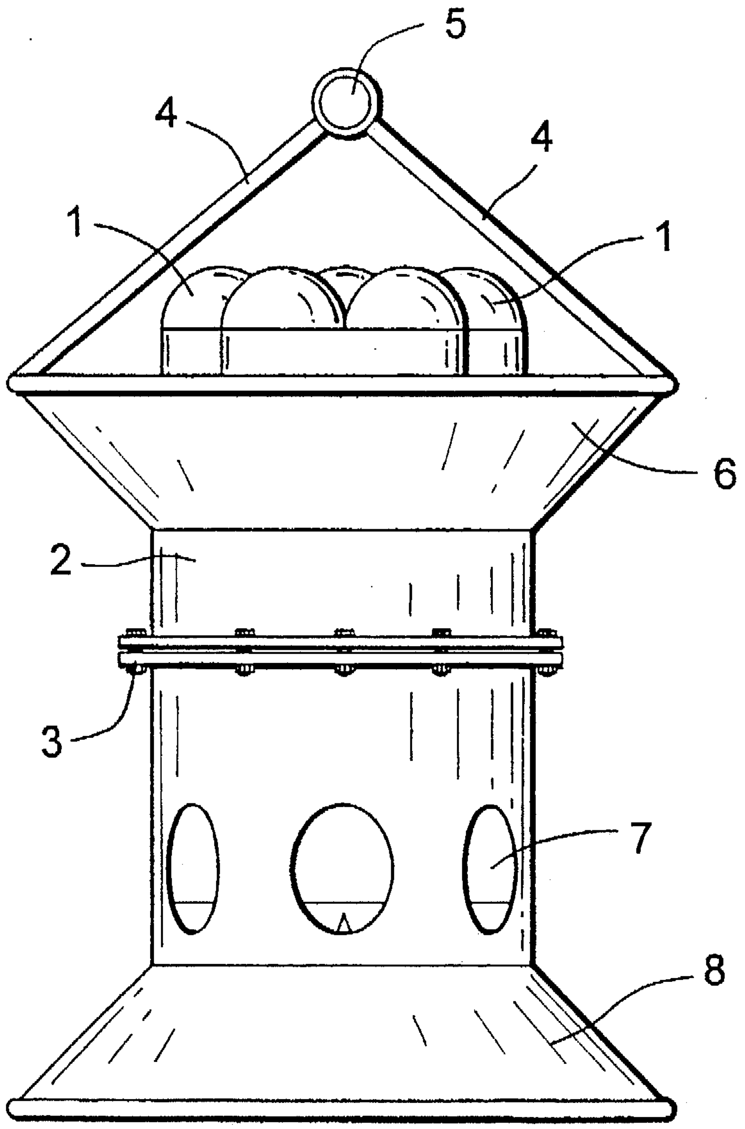
FIG. 1 shows the equipment according to the invention, directed downwards.

The equipment shown in the drawing comprises a set or a battery of hydraulic accumulators 1, in the example according to the drawing seven accumulators, which are held together by an enveloping jacket structure 2 which in the drawing is made of two parts joined together by means of a flange joint 3. The accumulators 1 can have an initial charge pressure of up to about 280 bar, although lower pressures also are possible, and can for the rest either be of conventional structure with a so-called gas bladder or membrane, or possibly be made in principle as has been presented in finnish patent application 931405, so that they at first deliver liquid only and in a later stage, when the drive pressure of the accumulators has fallen, a mixture of liquid and drive gas.

The equipment is intended to by means of stays 4 and a lift loop 5 be able to be lifted and lowered as needed from, e.g., a helicopter or a crane.

The upper part of the jacket structure 2 in FIG. 1 has a funnel-like part 6 widening upwards, preferably more or less conically, and the lower part of the jacket structure preferably has a number of jacket openings 7 near the outlet nozzle heads of the hydraulic accumulators 1, and a funnel-like part 8.

Figure 3:
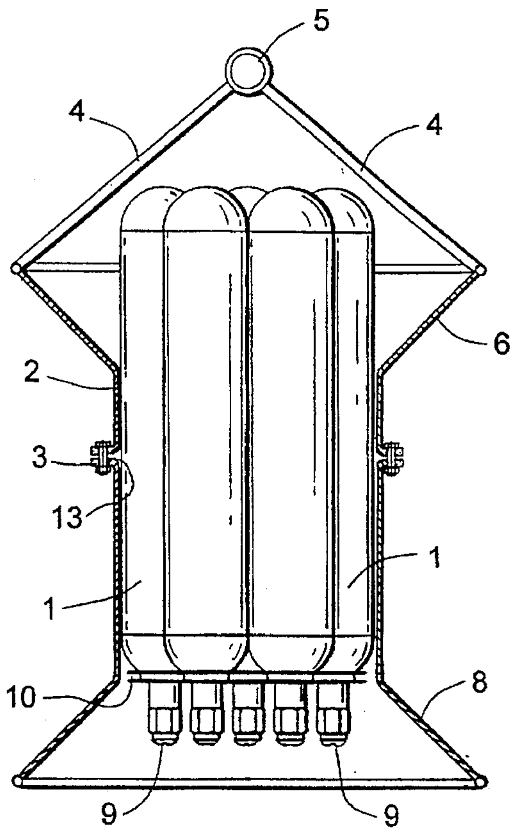
FIG. 3 shows a partial longitudinal section of the equipment of FIG. 1.

The outlet nozzle heads of the hydraulic accumulators 1, which also can be called spray heads, are visible in FIG. 3 and are designated 9. The spray heads 9 are preferably made as presented in the international patent application PCT/FI92/0155 (Publication No. W092/20453), with a number of obliquely downwards and outwards directed nozzles adapted mutually with respect to, among other things, droplet size and accumulator drive pressure, that they, producing a suction, deliver fog-like, proportionally concentrated liquid sprays, which effectively are capable of penetrating fire seats.

Figure 4:
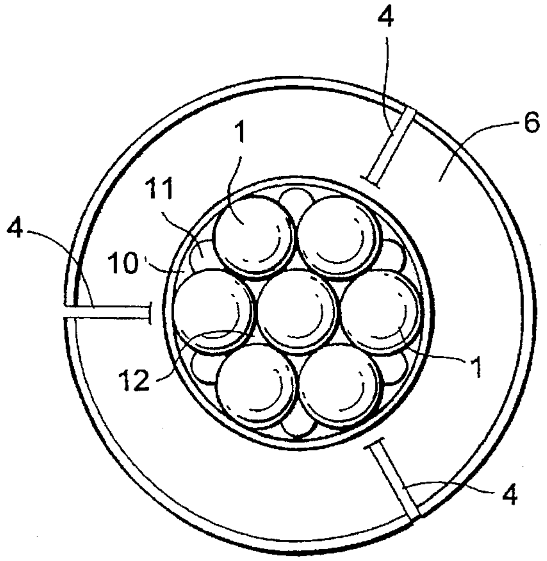
FIG. 4 shows the equipment of FIG. 1 seen from above.

The hydraulic accumulators 1 are carried by a support plate 10 visible in FIG. 3 and preferably fixed in the lower part of the jacket structure 2 and comprising a number of openings 11 visible in FIG. 4. Mutually between the hydraulic accumulators 1, as well as between the hydraulic accumulators 1 and the jacket structure 2, run air passages which are designated 12 and are visible likewise in FIG. 4. Reference numeral 13 in FIG. 3 indicates a band element which under the influence of the flange joint 3 presses the hydraulic accumulators in abutment against each other.

The equipment according to the invention can, preferably from a helicopter, be lowered to a suitable height above a fire seat and can be released by means of remote controlled means, known per se and not shown in the drawing. The nozzle heads 9 of the hydraulic accumulators produce a forceful suction, whereby necessary additional air is sucked in partly through the jacket openings 7 and partly via the channels 12 running along the set of accumulators and out past the nozzle heads 9 through the openings 11 of the plate 10. In particular through the jacket openings 7 will also smoke gases be sucked in, which is of advantage in that also these gases have an extinguishing effect.

As a fire can be attacked from above, which is the case, e.g., for forest fires, and the equipment thus is in vertical position according to FIGS. 1, 3, and 4, the air stream produced by the main rotor of the helicopter, which air stream is partly collected by the funnel-like part 6, boosts the penetration and the general effect of the extinguishing liquid.

If it for some reason is not suitable to attack a fire from above, the equipment can be turned obliquely to one side or possibly, sideways altogether. Such fires can be oil fires, e.g., on oil drilling rigs, or possibly fires in high buildings. At least in certain such cases a crane or the like can be used instead of a helicopter.

Figure 2:
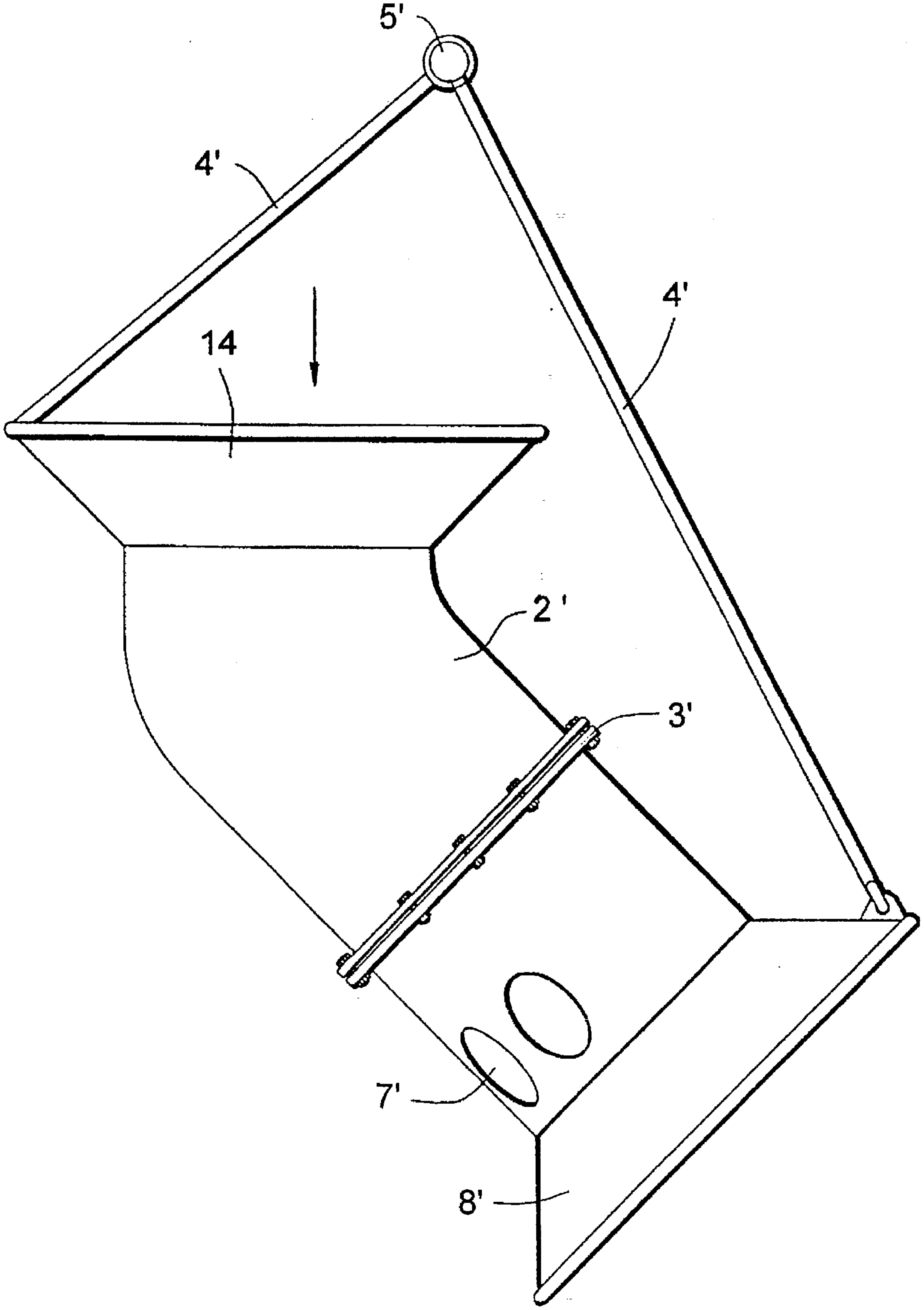
FIG. 2 shows the equipment directed to the side.

Especially in such cases, when the equipment is turned sideways but it still is of advantage to carry out the maneuvers of the equipment from a helicopter, the air stream produced by the rotor of the helicopter can be utilized by means of a bent-up funnel-like part 14 at the closed end of the long bottle-like hydraulic accumulators (1 in FIG. 1, not shown in FIG. 2) as is shown in FIG. 2. In the embodiment of FIG. 2 there are no jacket openings 7') on the upper side of the jacket structure. Other reference characters in FIG. 2 with primes correspond to the components with otherwise corresponding reference characters already described with respect to the other figures. Further or repetitive description is, therefore, unnecessary.

I claim:

1. Equipment for fighting a fire, said equipment comprising:

a suspension structure (4,5); and hydraulic accumulators (1) in said suspension for movement to within an action range of the fire and including outlet nozzles (9) at one end for utilizing a high drive pressure in said hydraulic accumulators to produce, by suction effect, a fog-like penetrating liquid spray;

said suspension structure comprising a jacket structure (2) for holding together said hydraulic accumulators in such a way that, between said hydraulic accumulators, there are longitudinal air channels (12).

2. The equipment according to claim 1, wherein said jacket structure holds said hydraulic accumulators in a plate (10) fixed in said jacket structure (2) and including openings (11) for holding said hydraulic accumulators.

3. The equipment according to claim 1, wherein said jacket structure (2) comprises air collecting means (6,14) at an opposite end of said hydraulic accumulators (1).

4. The equipment according to claim 3, wherein said air collecting means is generally conical.

5. The equipment according to claim 1, wherein said jacket structure has jacket openings (7).

6. The equipment according to claim 5, wherein said jacket openings are near said outlet nozzles.

7. The equipment according to claim 1, wherein said jacket structure (2) is made up of two parts joined about said hydraulic accumulators by a flange joint (3) and inside a band clamp (13).

8. The equipment according to claim 1, wherein said jacket structure holds said hydraulic accumulators in such a way that there are further longitudinal air channels between said jacket structure and said hydraulic accumulators.

* * * * *